United States Patent
Nadella et al.

(10) Patent No.: US 11,405,266 B2
(45) Date of Patent: Aug. 2, 2022

(54) AUTOMATIC CONFIGURATION OF VIRTUAL NETWORK FUNCTIONS

(71) Applicant: Verizon Patent and Licensing Inc., Basking Ridge, NJ (US)

(72) Inventors: Ramesh Nadella, Allen, TX (US); Mahesh Chapalamadugu, Irving, TX (US); Manish Srivastava, Frisco, TX (US); Raju Sharma, Raleigh, NC (US); Ravi Chunduru, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 181 days.

(21) Appl. No.: 16/017,581

(22) Filed: Jun. 25, 2018

(65) Prior Publication Data
US 2019/0394087 A1    Dec. 26, 2019

(51) Int. Cl.
*H04L 41/0803* (2022.01)
*H04L 41/14* (2022.01)
*H04L 12/46* (2006.01)

(52) U.S. Cl.
CPC ...... *H04L 41/0803* (2013.01); *H04L 12/4641* (2013.01); *H04L 41/14* (2013.01)

(58) Field of Classification Search
CPC . H04L 12/4641; H04L 41/0803; H04L 41/14; H04L 67/16; H04L 41/0816; H04L 41/12; H04L 61/1511; H04W 24/02; G06F 9/45558; G06F 2009/45595; G06F 2009/4557; G06F 9/5077
See application file for complete search history.

(56) References Cited

U.S. PATENT DOCUMENTS

| | | | |
|---|---|---|---|
| 10,785,109 B1* | 9/2020 | Sidebottom | H04L 67/16 |
| 2011/0004676 A1* | 1/2011 | Kawato | G06F 8/63 709/221 |
| 2015/0089331 A1* | 3/2015 | Skerry | G06F 9/45533 714/799 |
| 2015/0295750 A1* | 10/2015 | Blanco | G06F 9/50 714/4.2 |
| 2017/0230477 A1* | 8/2017 | Ross | H04L 41/142 |
| 2017/0237647 A1* | 8/2017 | N | H04L 41/12 709/224 |
| 2017/0289060 A1* | 10/2017 | Aftab | H04L 67/1097 |
| 2017/0308415 A1* | 10/2017 | Das | G06F 9/543 |
| 2018/0204234 A1* | 7/2018 | Hermoni | G06Q 10/06 |
| 2019/0109765 A1* | 4/2019 | Shibata | H04L 41/12 |
| 2019/0280920 A1* | 9/2019 | Wang | H04L 69/22 |

* cited by examiner

*Primary Examiner* — Jonathan A Bui
*Assistant Examiner* — Zonghua Du

(57) ABSTRACT

A device can receive virtual network function (VNF) data associated with multiple VNFs. The device can generate multiple configuration templates that are to be used by a network design tool that is capable of creating a design of a network for an organization. The device can receive, from a user device, object data associated with network design objects that have been added to or removed from the interface of the network design tool. The device can generate multiple VNF configuration files that allow two or more of the multiple VNFs to be supported by network devices associated with the organization. The device can perform actions associated with configuring two or more of the multiple VNFs onto the network devices to permit the network devices to utilize virtual resources while executing the two or more of the multiple VNFs.

20 Claims, 8 Drawing Sheets

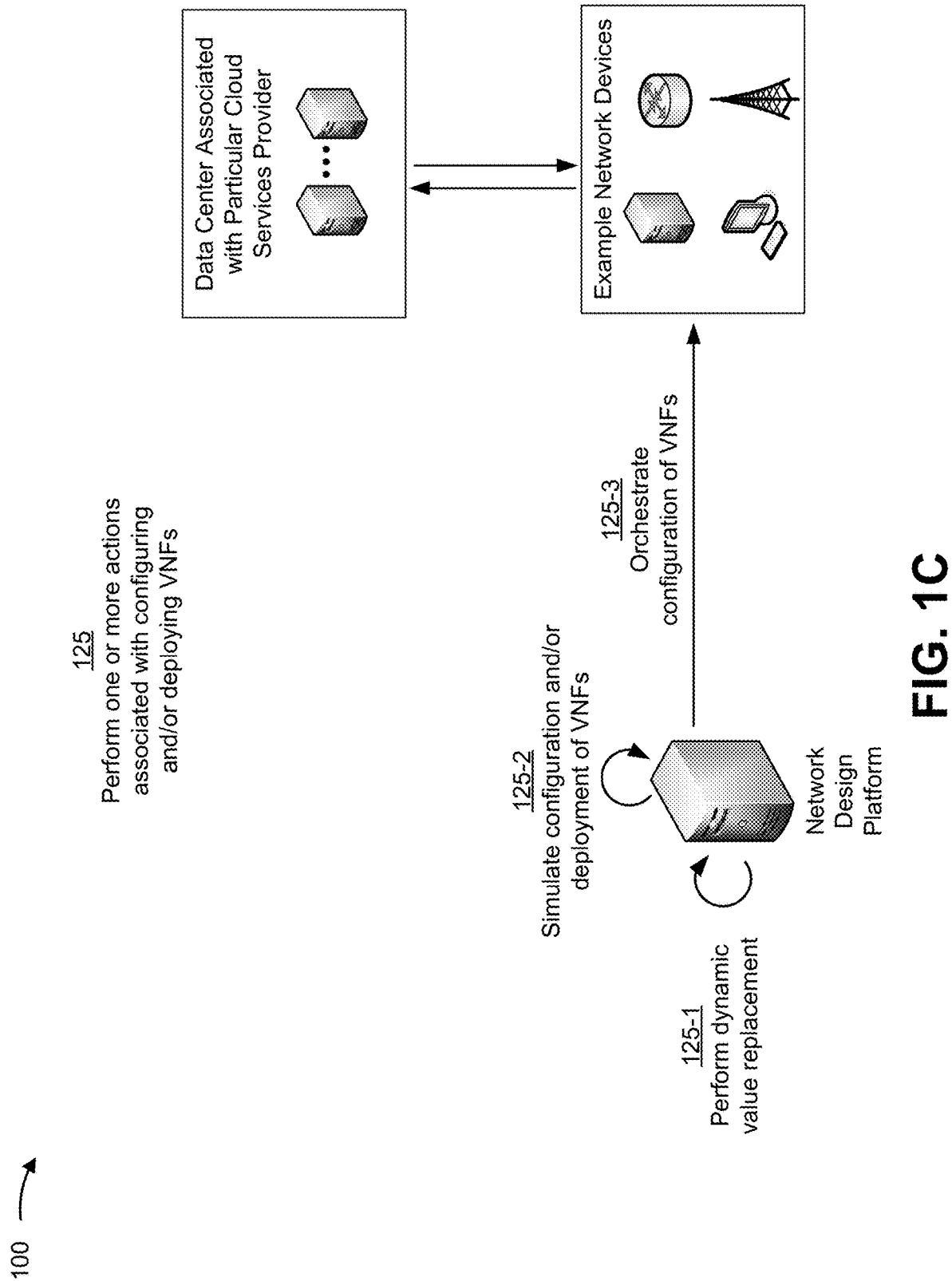

500 ⤴

510 — Receive virtual network function (VNF) data associated with a plurality of VNFs, wherein the plurality of VNFs are supported by a plurality of vendor organizations, wherein the VNF data includes configuration instructions for the plurality of VNFs, and wherein the configuration instructions for a first VNF, of the plurality of VNFs, is different than the configuration instructions for a second VNF, of the plurality of VNFs 520 — First trigger satisfied? — No / Yes 530 — Generate, by processing the VNF data, a plurality of configuration templates that are to be used by a network design tool that is capable of being used to create a design of a network for an organization, wherein the network design tool includes an interface to display network design objects, and wherein the plurality of configuration templates associate the network design objects with the configuration instructions for the plurality of VNFs 540 — Receive, from a user device, object data associated with one or more network design objects that have been added to or removed from the interface of the network design tool

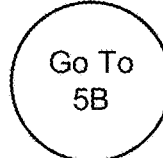

AUTOMATIC CONFIGURATION OF VIRTUAL NETWORK FUNCTIONS

BACKGROUND

Software-defined networking (SDN) is an approach to cloud computing that facilitates network management and network configuration processes. Network function virtualization (NFV) is an architectural concept that involves virtualizing entire classes of network functions into building blocks that can interact to create communication services.

BRIEF DESCRIPTION OF THE DRAWINGS

FIGS. 1A-1C are diagrams of an overview of an example implementation described herein.

FIGS. 5A and 5B are a flowchart of an example process for automatically generating a group of virtual network function (VNF) configuration files for a group of VNFs and performing one or more actions associated with using the VNF configuration files to configure and/or to deploy the group of VNFs.

DETAILED DESCRIPTION OF PREFERRED EMBODIMENTS

Figure 1A:
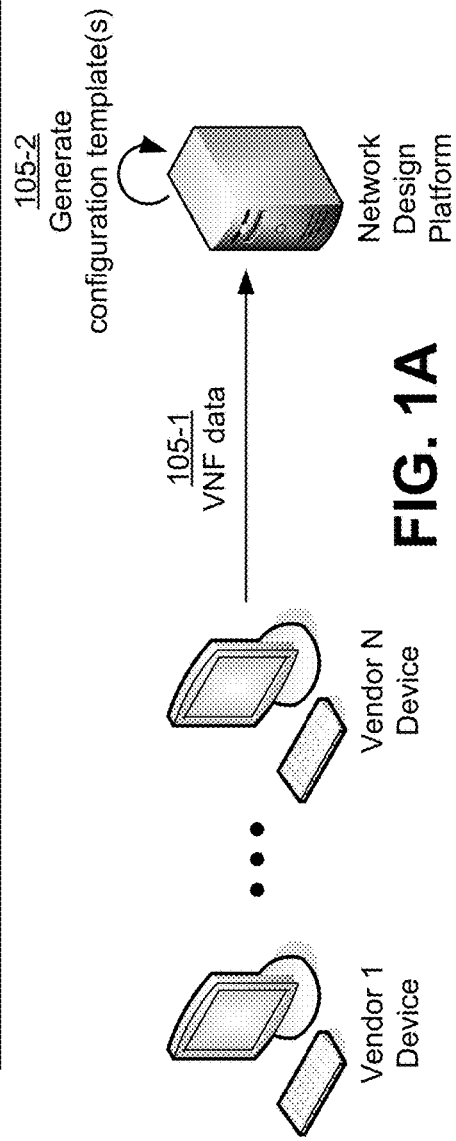

The following detailed description of example implementations refers to the accompanying drawings. The same reference numbers in different drawings can identify the same or similar elements.

Vendor organizations can offer client organizations virtual network functions (VNFs), such as a virtual routing function, a virtual security function, a virtual wide area network (WAN) optimization function, and/or the like. For example, a vendor organization can offer a client organization one or more virtual network functions (VNFs) that can be supported on network devices of the client organization. As an example, the client organization can purchase a hardware device (e.g., a router, a server, a desktop computer, etc.) from a first vendor organization, and can configure a set of VNFs onto the hardware device, such that the hardware device is able to interact with virtual resources (e.g., provided by servers in a data center) to carry out the set of VNFs.

However, the client organization can be unable to efficiently and/or effectively configure and utilize the set of VNFs on the hardware device. For example, the client organization can have purchased the set of VNFs from different vendor organizations, where the set of VNFs have different configuration properties, such as program code that uses different types of program syntax, different types of program code structure, different naming conventions within the program code (e.g., for function names, object names, variable names, etc.), and/or the like. Additionally, each VNF can be supported by particular cloud service providers, and each cloud service provider can use a different procedure for configuring access to virtual resources, a different procedure for accessing the virtual resources (e.g., different application programming interfaces (APIs)), and/or the like.

In this case, configuring and utilizing the set of VNFs can require the client organization to hire teams of software developers with specialized backgrounds relating to particular vendor organizations, particular types of programming syntax, particular cloud service providers, and/or the like. Additionally, or alternatively, the client organization can expend resources (e.g., processing resources, network resources, etc.) to attempt configure each VNF, to test each VNF once configured, to attempt to synergize multiple VNFs such that each VNF, if needed, is able to interact with other VNFs being hosted on the hardware device, and/or the like. Additionally, or alternatively, many vendor organizations and/or cloud service providers have been unwilling to agree to a uniform standard that might eliminate some of the differences described above.

Some implementations described herein provide a network design platform to support a network design tool to create a design of a network that utilizes a set of VNFs, where creating the design of the network causes the network design platform to perform one or more actions associated with configuring and/or deploying the set of VNFs. For example, an individual can interact with a user device to access the network design tool via an interface (e.g., a web interface), and can use the network design tool to create the design of the network.

In this case, as the individual is interacting with the interface to create the design of the network, the network design platform can intelligently generate a set of VNF configuration files for the set of VNFs. Additionally, the network design platform can perform one or more additional actions associated with using the set of VNF configuration files to configure and/or deploy the set of VNFs, as described further herein.

In this way, the network design platform is able to orchestrate automatic configuration and/or deployment of VNFs that have different configuration properties. Additionally, or alternatively, the network design platform conserves processing resources and/or network resources that might otherwise be used to improperly configure, test, and/or synergize the set of VNFs, perform error correction procedures associated with the improper configuration, and/or the like.

Figure 1B:
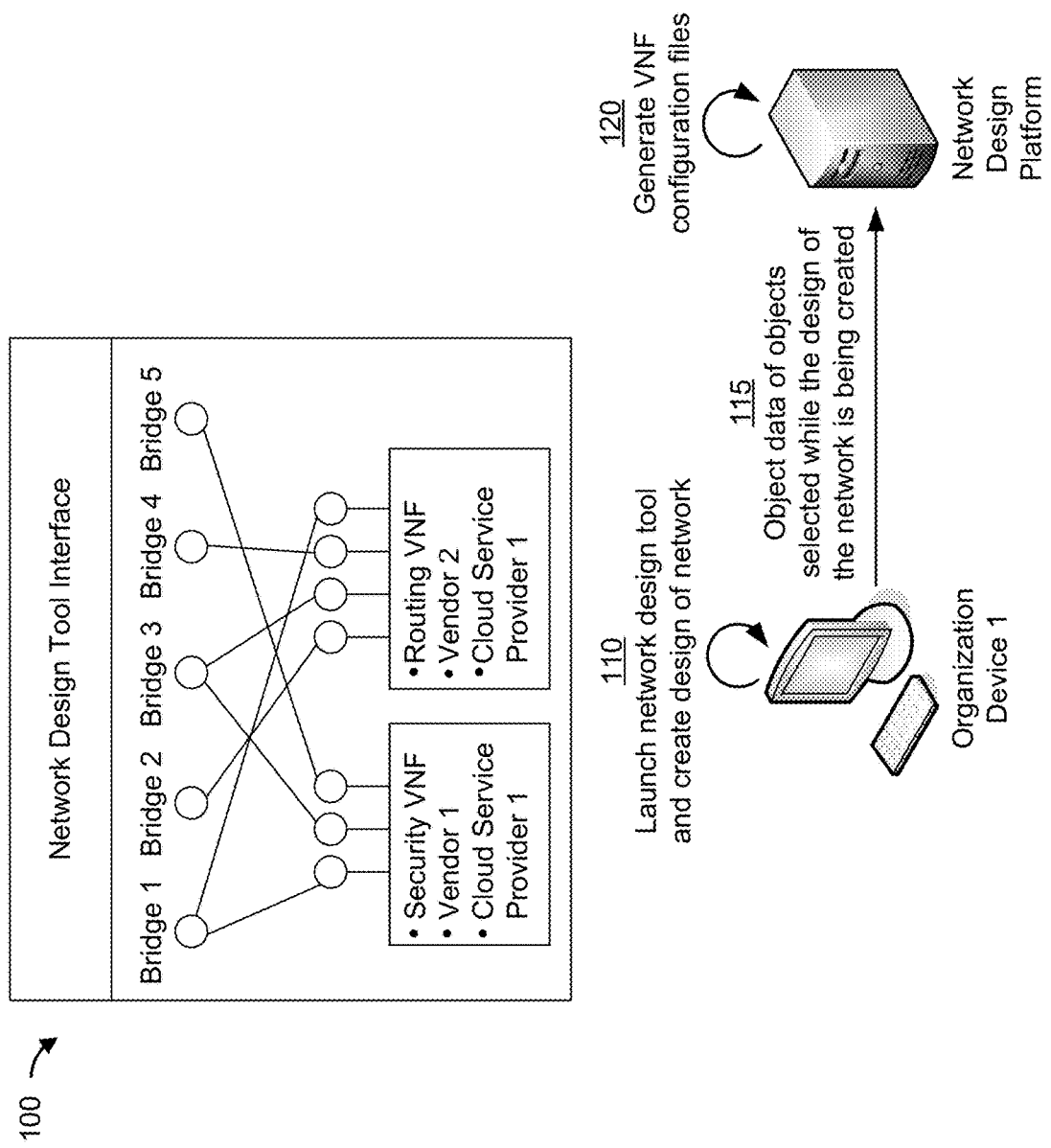

FIGS. 1A-1C are diagrams of an overview of an example implementation 100 described herein. For example, example implementation 100 can include a network design platform, a group of vendor devices (shown as Vendor 1. Device through Vendor N Device) associated with a group of vendor organizations (e.g., organizations that offer virtual network functions (VNFs) as services), and a device associated with an organization (shown as Organization Device 1) that is to use a network design tool to create a design of network. The design of the network can include a set of VNFs, and the network design platform can perform one or more actions associated with automatically configuring and/or deploying the set of VNFs.

As shown in FIG. 1A, and by reference number 105, the organization can onboard the group of vendor organizations to obtain VNF data that is to be used to create the network design tool. The network design tool can be a software development tool that provides an individual (e.g., a software developer) with one or more development features that can be used to create the design of the network.

As shown by reference number 105-1, part of the onboarding process can involve the group of vendor organizations providing the network design platform with VNF data for the set of VNFs. For example, the network design platform can provide a request to the group of vendor devices for the VNF data, which can cause the group of vendor devices to provide the VNF data to the network design platform. Additionally, or alternatively, the group of vendor devices can automatically provide the VNF data to the network design platform as part of the onboarding process.

The VNF data, for a VNF, can include a VNF identifier, a vendor identifier of a vendor organization supporting the VNF, a cloud service identifier to identify a cloud service provider that supports the VNF, descriptive metadata relating to the VNF, configuration instructions for the VNF, and/or the like. The VNF identifier can identify a particular type of VNF, such as a routing VNF, a security VNF, a wide area network (WAN) optimization VNF, and/or the like. The descriptive metadata relating to the VNF can include information identifying a minimum number of resources needed for the VNF to operate, licensing data for the VNF, and/or the like.

The configuration instructions for the VNF can be part of a sample configuration file, which, as described further herein, can be analyzed to identify a type of programming syntax used within the program code of the VNF, a program code structure within the program code, naming conventions used within the program code, and/or the like. The program code structure can identify a manner with which functions and/or logic of the program code is organized. For example, a first VNF associated with a first vendor organization can support five interfaces and can include program code with one interface function that includes sub-functions for each of the five interfaces. In comparison, a second VNF associated with a second vendor organization can support the same five interfaces and can include program code with separate interface functions for the five interfaces. The naming conventions can relate to stylistic deviations in syntax of function names, object names, class names, variable names, and/or the like.

In some cases, a sample configuration file can include configuration instructions that are specific to a particular cloud service provider. For example, to allow the VNF to utilize virtual resources of the particular cloud service provider, the configuration instructions can include information identifying an internet protocol (IP) address of a cloud server, information identifying a type of connection that is to be used for data transmission to and from the cloud server (e.g., a hypertext transfer protocol (HTTP) connection, a secure HTTP connection, etc.), information identifying an interface (e.g., an application programming interface (API)) that is to be used to access the virtual resources, information identifying an amount of virtual resources to allocate to the VNF, and/or the like. In some implementations, different cloud service providers sample configuration files can include different types of configuration instructions. In some implementations, if the VNF is supported by multiple cloud service providers, separate sample configuration files can be used for each of the multiple cloud service providers.

As shown by reference number 105-2, the network design platform can generate a set of configuration templates. For example, the network design platform can use a natural language processing technique, a pattern recognition technique, and/or the like, to analyze the VNF data for a VNF. This can allow the network design platform to identify, for the VNF, one or more patterns within the program code that can be used to generate a configuration template. The one or more patterns can include a pattern associated with a particular programming syntax used within the program code, a pattern associated with a particular code structure of the program code, a pattern associated with a naming convention within the program code, and/or the like.

In some implementations, the network design platform can, based on the one or more identified patterns, generate a configuration template. For example, the network design platform can generate a configuration template that stores one or more lines of configuration instructions of the VNF and object data for a set of objects (e.g., defined elsewhere herein) that are capable of being displayed by the user interface of the design tool. In this case, the network design platform can generate the configuration template in a manner that establishes an association between the one or more lines of configuration instructions and the object data.

In some implementations, as shown above, the network design platform can generate a configuration template for each VNF. In some implementations, the network design platform can generate a configuration template for the set of VNFs. For example, the network design platform can generate a configuration template that associates the set of object identifiers with one or more sets of configuration instructions associated with one or more corresponding sets of vendor organizations.

In this way, the network design platform is able to generate a set of VNF configuration templates that can be used to create the design of the network, as described further herein.

As shown in FIG. 1B, and by reference number 110, the device associated with the organization can launch the network design tool and can create the design of the network. For example, an individual (e.g., a network design specialist) can interact with the device associated with the organization to launch the network design tool, the device associated with the organization can automatically launch the network design tool based on a trigger (e.g., receiving the request to create the design of the network, etc.), and/or the like, as described further herein. Additionally, or alternatively, the individual can interact with the user interface of the network design tool to create the design of the network, the device associated with the can automatically create the design of the network, and/or the like, as described further herein.

In some implementations, the individual (e.g., the network design specialist) can interact with the device associated with the organization to launch the network design tool and to create the design of the network. For example, the individual can launch the network design tool after receiving instructions to create the design of the network. The instructions can indicate that the design of the network is to be created for a particular organization (e.g., for the organization, for a client of the organization, etc.), that the design is to include a set of VNFs that are capable of being supported by a group of network devices within the network, and/or the like.

The network design tool can include a user interface that is capable of displaying a set of objects associated with the design of the network. The set of objects can include object data that identifies particular properties or attributes of objects, such as a set of object identifiers that identify a VNF, an interface, a bridge, a link, a vendor organization, a cloud services provider, and/or the like. Additionally, or alternatively, the object data can include an action identifier to indicate whether the object is being added or removed from the design of the network.

As shown as an example, the individual can interact with the network design tool to create the set of VNFs (shown as a set of two VNFs that includes a security VNF and a routing VNF). For example, the individual can select the security VNF and the routing VNF from a drop-down menu, can drag and drop objects identifying the security VNF and the routing VNF onto the user interface, and/or the like. In this case, the security VNF and the routing VNF can utilize different types of programming syntax, program code structure, program code naming conventions, and/or the like.

Continuing with the example, the individual can interact with the network design tool to select that the security VNF be provided by a first vendor organization (shown as Vendor 1), and that the routing VNF be provided by a second vendor organization (shown as Vendor 2). Additionally, the individual can interact with the network design tool to select that the security VNF and the routing VNF be provided by a first cloud service provider (shown as Cloud Service Provider 1).

Continuing with the example, the individual can complete the design of the network by adding a set of interfaces for each VNF, a set of bridges, a set of links, and/or any other network device, network component, and/or network element that can be used as part of the design of the network. For example, the individual can interact with the user interface of the network design tool to add a first set of interfaces to the security VNF (e.g., the three circles shown can represent three interfaces), and to add a second set of interfaces to the routing VNF (e.g., the four circles shown can represent four interfaces). In some implementations, an interface can be a virtual interface for the VNF. In some implementations, the interface can be a physical interface on a network device that is capable of supporting the VNF, and can be used to establish a connection between the VNF and the network device.

Continuing with the example, the individual can interact with the user interface of the network design tool to add a set of bridges to the design of the network. A bridge can serve as a connection between a first VNF and a second VNF, the first VNF and a particular network device, network component, and/or network element, the first VNF and a device outside of the network, and/or the like. Furthermore, the individual can interact with the user interface of the network design tool to add a set of links that connect the interfaces and the bridges. The set of links can be used to establish connections between the first and second set of interfaces and the set of bridges. In this way, the individual is able to use the network design tool to create the design of the network.

In some implementations, the device associated with the organization can automatically launch the network design tool. For example, the device associated with the organization can be configured to automatically launch the network design tool based on a trigger, such as the request to create the design of the network, based on a time period matching a threshold time period, and/or the like.

In some implementations, the network design platform can use machine learning to generate one or more recommendations for the design of the network and/or to automatically create the design of the network. For example, the network design platform can train a machine learning model on historical data, and can use the machine learning model to process information included in the request to create the network design, identifiers associated with the organization (e.g., an identifier of the organization, an identifier of the individual, an individual of the device associated with the organization, etc.), and/or the like. The historical data can include historical VNF data, historical configuration templates, historical VNF configuration files, historical user data (e.g., identifying which objects particular individuals select), historical vendor data (e.g., identifying which program code syntax particular vendors use, which program code structures, etc.), and/or the like.

In some implementations, the network design platform can create the design of network by automatically adding objects to the user interface of the network design tool. For example, the network design platform can provide the inputs to the machine learning model (e.g., as described above), which can cause the machine learning model to output values associated with likelihoods of particular objects being preferred by the individual and/or the organization. In this case, the network design platform can automatically add the objects based on a trigger, such as a threshold confidence value identifying a likelihood of the objects being preferred by the individual and/or the organization, a requirement to include the object in the design of the network (e.g., as indicated by the request to create the design of the network, which can have been submitted to the network design platform), and/or the like.

In some implementations, the device associated with the individual can automatically generate one or more recommendations to be provided to the user interface of the network design tool. For example, as the individual creates the design of the network, the network design platform can provide the object data as input to the machine learning model, which can cause the machine learning model to output a value associated with a particular recommendation. The recommendation can be to add an object, to remove an object, to replace a first object with a second object, and/or the like.

In some implementations, the network design platform can provide the recommendation for display on the user interface of the network design tool. This can allow the individual to select the recommendation, which can automatically populate the user interface of the network design tool with the objects associated with the recommendation.

As shown by reference number 115, the device associated with the organization can provide object data of an object selected while the design of the network is being created. For example, as the individual is creating the design of the network, the individual can add or remove an object (e.g., a VNF, a bridge, an interface, a link, etc.) from the user interface of the network design tool. This can cause the device associated with the organization to provide, to the network design platform, the object data associated with the object being added or removed. In some implementations, such as when the device associated with the first organization is to automatically create the design of the network, the device associated with the organization can provide the object data to the network design platform in a similar manner.

The object data can include a set of object identifiers identifying particular properties or attributes of objects, such as object identifiers that identify a VNF, an interface, a bridge, a link, a vendor organization, a cloud services provider, and/or the like. Additionally, or alternatively, the object data can include an action identifier to indicate whether the object is being added or removed from the design of the network.

As shown by reference number 120, the network design platform can generate a set of VNF configuration files for the set of VNFs. For example, the network design platform can generate a VNF configuration file for a particular VNF (e.g., the security VNF, the routing VNF, etc.), such that the VNF configuration file includes configuration instructions that are found in a particular configuration template of the set of configuration templates. To generate the VNF configuration file, the network design platform can identify the configuration template, identify one or more lines of configuration instructions included within the identified configuration template, and can add the one or more lines of configuration instructions to the VNF configuration file, as each described below.

In some implementations, the network design platform can identify the configuration template to be used to generate the VNF configuration file. For example, a data structure can associate the set of configuration templates with object identifiers that identify the set of VNFs. In this case, the network design platform can use an object identifier that identifies the particular VNF to search the data structure to identify a matching object identifier that is stored in association with a configuration template that is to be used to generate the VNF configuration file. In some implementations, the network design platform can identify the configuration template by searching through the set of configuration templates (e.g., instead of searching the data structure).

In some implementations, the network design platform can identify the one or more lines of configuration instructions. For example, as described above, the object data can include a set of object identifiers relating to interfaces, bridges, links, vendor organizations, cloud service providers, and/or the like, and the network design platform can use the set of object identifiers to search through the identified configuration template, which can store the set of object identifiers in association with the one or more lines of the configuration instructions.

In some implementations, the network design platform can generate a VNF configuration file that includes the one or more lines of the configuration instructions. For example, the network design platform can generate a new VNF configuration file if a file has not been previously created, and can add the one or more lines of the configuration instructions into the new VNF configuration file. In other cases, the individual can have already started creating the design of the network, in which case the VNF configuration file can already have been created, and the network design platform can simply add the one or more lines of the configuration instructions into the VNF configuration file.

In some cases, the network design platform can remove one or more lines of program code from the VNF configuration file. For example, if the individual removed an object from the user interface of the network design tool, the network design platform can have received object data that included an action identifier associated with removing the one or more lines of executable instructions from the VNF configuration file.

In this way, the network design platform is able to generate a set of VNF configuration files that can be used to automatically configure one or more network devices with the set of VNFs, as described further herein.

As shown in FIG. 1C, and by reference number 125, the network design platform can perform one or more actions associated with configuring and/or deploying the set of VNFs. For example, the organization can need to configure and/or deploy the set of VNFs within a network of the organization, or can need to configure and/or deploy the set of VNFs within a network associated with a client organization. In these cases, the network design platform can perform one or more actions to orchestrate the configuration and/or the deployment of the set of VNFs, as described below.

As shown by reference number 125-1, the network design platform can perform a dynamic value replacement to replace values included in the set of VNF configuration files with values associated with one or more network devices. For example, the one or more network devices can be deployed with dynamic device-specific values (e.g., a network device identifier, such as an internet protocol (IP) address, which can be assigned when the one or more network devices join the network). This means the set of VNF configuration files can only be able to configure the set of VNFs onto the one or more network devices if particular place holder values included in the set of VNF configuration files are replaced with the dynamic device-specific values.

In this case, assume the network design platform receives network configuration data. The network configuration data for a network device can include a network device identifier (e.g., an IP address, etc.), interface identifiers for the network device (e.g., to identify physical interfaces, virtual interfaces that are being used as part of VNFs that are already deployed, etc.), performance data of the network device (e.g., a physical interface can have certain processing limitations), and/or the like. In this case, the network design platform can perform a dynamic value replacement to replace dynamic values included in the set of VNF configuration files with values included in the network configuration data.

Additionally, or alternatively, and as shown by reference number 125-2, the network design platform can simulate configuration and/or deployment of the set of VNFs using one or more test environments. For example, the network design platform can use a test environment that simulates the designed network, a current live network, and/or the like. In this case, the network design platform can configure the set of VNFs onto one or more simulated network devices. This can allow the network design platform to determine whether the set of VNFs have been configured to function properly, whether the set of VNFs have been configured to function optimally, whether the set of VNFs are able to use particular interfaces, bridges, and/or links to communicate (e.g., with each other, with other network devices, with devices outside of the network, etc.), whether any errors associated with configuration and/or deployment need to corrected, and/or the like.

In some implementations, the network design platform can support a test environment for each VNF configuration file. In some implementations, the network design platform can support a test environment for testing all (or some) VNF configuration files).

As shown by reference number 125-3, the network design platform can orchestrate configuration of the set of VNFs. For example, the network design platform can provide the set of VNF configuration files to the one or more network devices (shown as Example Network Devices). In this case, the one or more network devices can support one or more virtual machines (VMs) that are capable of supporting the set of VNFs. Additionally, the one or more network devices can execute the set of VNF configuration files (or particular VNF configuration files) to configure the set of VNFs (or particular VNFs) onto the one or more network devices. In some implementations, the one or more network devices might need to interact with one or more cloud servers associated with the cloud service providers to access virtual resources needed to configure the set of VNFs and/or to perform services enabled by the set of VNFs.

In this way, the network design platform is able to orchestrate automatic configuration of VNFs that have different configuration properties. Additionally, or alternatively, the network design platform conserves processing resources and/or network resources that might otherwise be used to improperly configure, test, and/or synergize the set of VNFs, perform error correction procedures associated with the improper configuration, and/or the like.

As indicated above, FIGS. 1A-1C are provided merely as an example. Other examples are possible and can differ from what was described with regard to FIGS. 1A-1C. For example, while implementations described herein utilize a network design platform, in other implementations, the device associated with the organization can support all (or some) functionality described as being performed by the network design platform.

Figure 2:
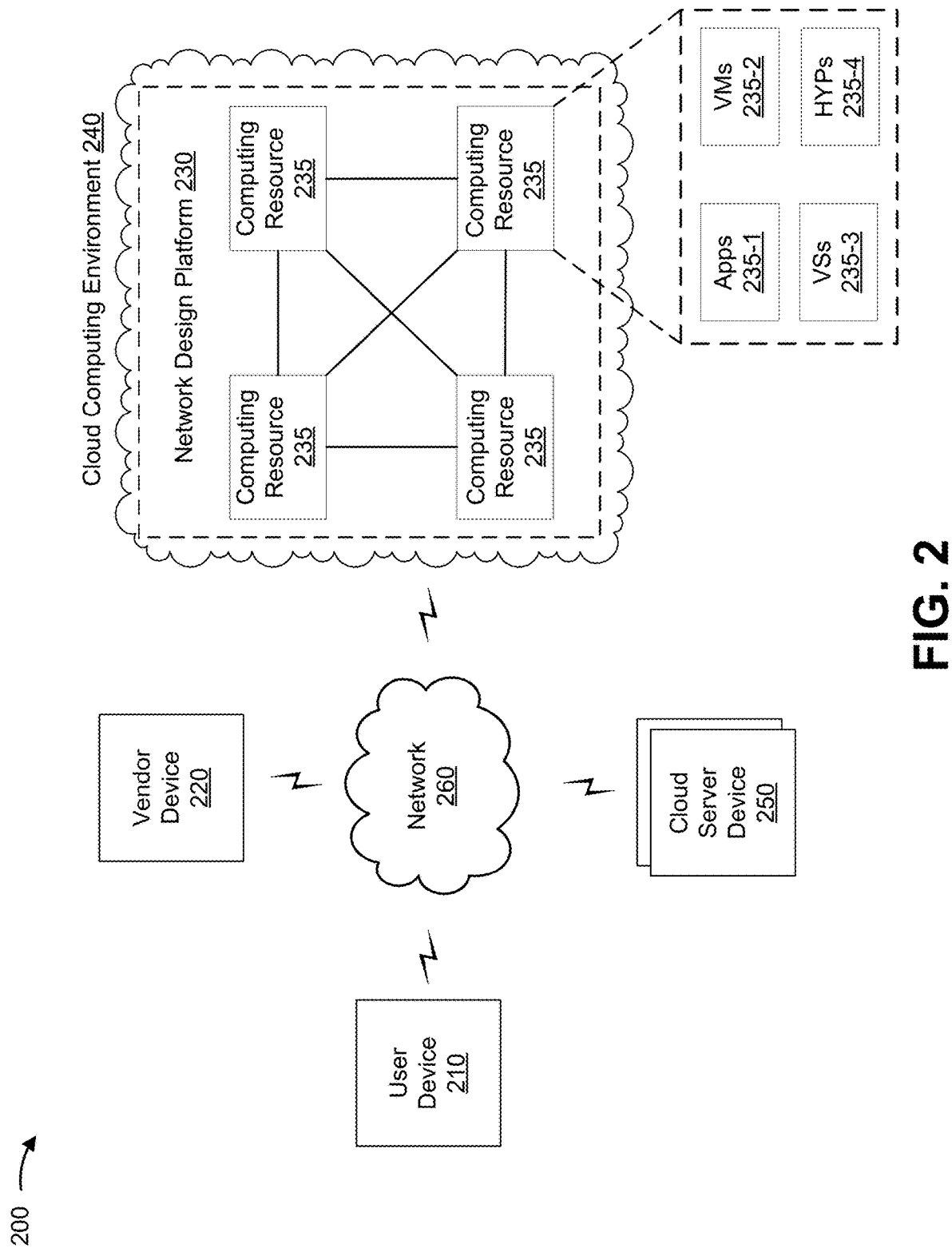
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a vendor device 220, a network design platform 230 hosted by a cloud computing environment 240, a cloud server device 250, and/or a network 260. Devices of environment 200 can interconnect via wired connections, wireless connections, or a combination of wired and wireless connections.

User device 210 includes one or more devices capable of receiving, storing, processing, generating, and/or providing information associated with one or more virtual network functions (VNFs). For example, user device 210 can include a computing device (e.g., a desktop computer, a laptop computer, a tablet computer, a handheld computer, a server device, etc.), a mobile phone (e.g., a smart phone, a radiotelephone, etc.), or a similar device. In some implementations, user device 210 can support a network design tool that includes an interface for allowing an individual to create a design of a network. In some implementations, as the network design tool is being used to create the design of the network, user device 210 can provide network design platform 230 with object identifiers associated with objects that the individual is adding to or removing from the design of the network.

Vendor device 220 includes one or more devices capable of receiving, storing, processing, generating, and/or providing VNF data. For example, vendor device 220 can include a server device or a group of server devices. In some implementations, the network design tool can be supported on vendor device 220, which can permit vendor device 220 to perform one or more actions described as being performed by user device 210. In some implementations, vendor device 220 can provide VNF data to network design platform 230.

Network design platform 230 includes one or more devices capable of receiving, storing, processing, generating, and/or providing information associated with one or more VNFs. For example, network design platform 230 can include a server device (e.g., a host server, a web server, an application server, etc.), a data center device, or a similar device. In some implementations, network design platform 230 can generate a set of VNF configuration files. In some implementations, network design platform 230 can provide the set of VNF configuration files to a test environment. In some implementations, network design platform 230 can performs actions associated with configuring one or more network devices with the set of VNF configuration files (e.g., to enable the one or more network devices to host the set of VNFs).

In some implementations, as shown, network design platform 230 can be hosted in cloud computing environment 240. Notably, while implementations described herein describe network design platform 230 as being hosted in cloud computing environment 240, in some implementations, network design platform 230 can not be cloud-based (i.e., can be implemented outside of a cloud computing environment) or can be partially cloud-based.

Cloud computing environment 240 includes an environment that hosts network design platform 230. Cloud computing environment 240 can provide computation, software, data access, storage, etc. services that do not require end-user knowledge of a physical location and configuration of system(s) and/or device(s) that hosts network design platform 230. As shown, cloud computing environment 240 can include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 can host network design platform 230. The cloud resources can include compute instances executing in computing resource 235, storage devices provided in computing resource 235, data transfer devices provided by computing resource 235, etc. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 can include one or more software applications that can be provided to or accessed by user device 210 and/or vendor device 220. Application 235-1 can eliminate a need to install and execute the software applications on these devices. For example, application 235-1 can include software associated with network design platform 230 and/or any other software capable of being provided via cloud computing environment 240. In some implementations, one application 235-1 can send/receive information to/from one or more other applications 235-1, via virtual machine 235-2.

Virtual machine 235-2 can include a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program, and can support a single process. In some implementations, virtual machine 235-2 can execute on behalf of another device (e.g., user device 210 and/or vendor device 220), and can manage infrastructure of cloud computing environment 240, such as data management, synchronization, or long-duration data transfers.

Virtualized storage 235-3 can include one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 can provide hardware virtualization techniques that allow multiple operating systems (e.g., "guest operating systems") to execute concurrently on a host computer, such as computing resource 235. Hypervisor 235-4 can present a virtual operating platform to the guest operating systems, and can manage the execution of the guest operating systems. Multiple instances of a variety of operating systems can share virtualized hardware resources.

Cloud server device 250 includes one or more devices capable of receiving, storing, processing, generating, and/or providing information associated with a VNF. For example, cloud server device 250 can include a server device or a group of server devices. In some implementations, cloud server device 250 can provide cloud services to the VNF. The cloud services can include virtual computing resources, virtual storage resources, virtual network resources, and/or the like.

Network 260 includes one or more wired and/or wireless networks. For example, network 260 can include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
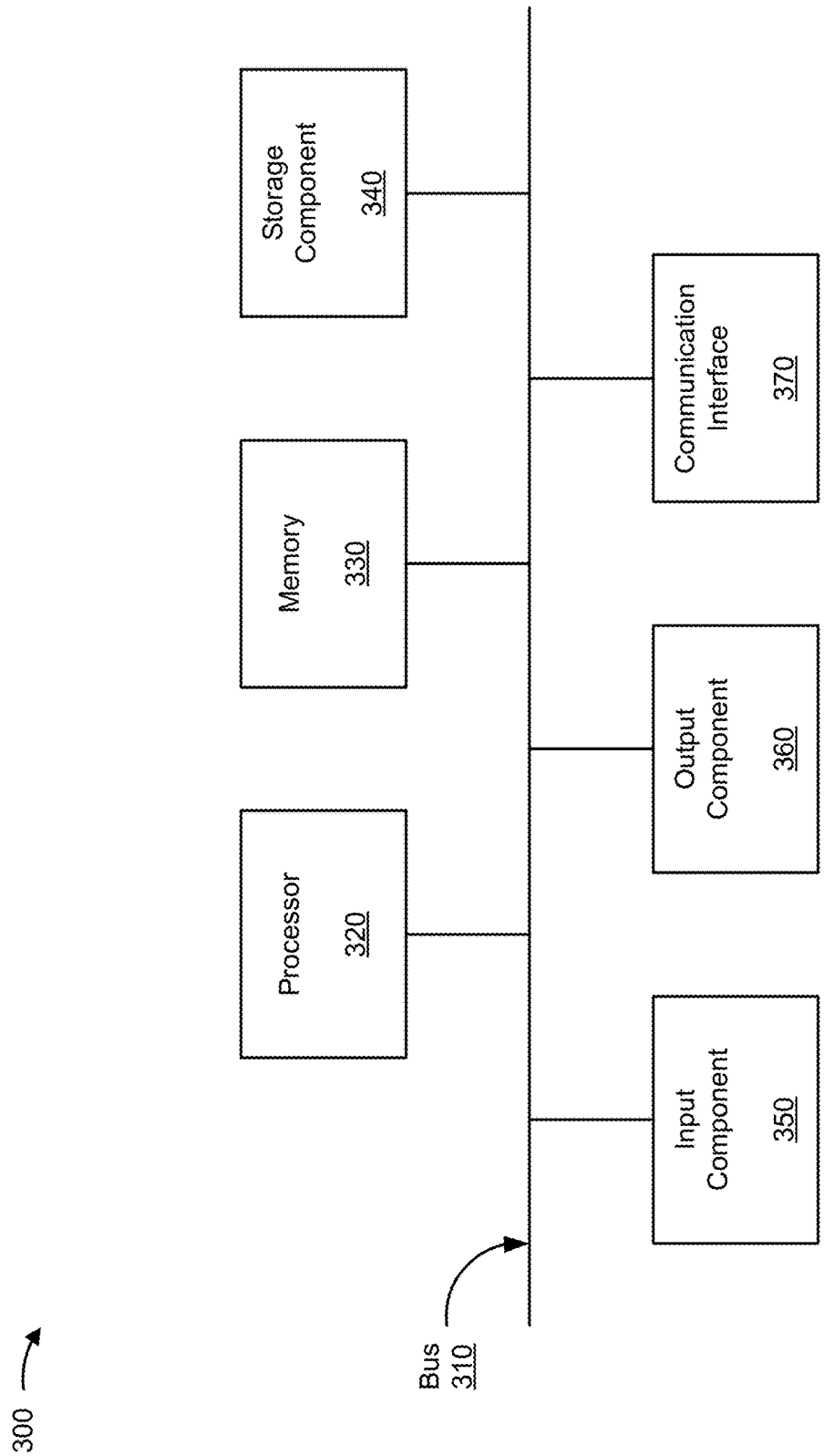
FIG. 3 is a diagram of example components of one or more devices of FIG. 2.

FIG. 3 is a diagram of example components of a device 300. Device 300 can correspond to user device 210, vendor device 220, network design platform 230, and/or cloud server device 250. In some implementations, user device 210, vendor device 220, network design platform 230, and/or cloud server device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
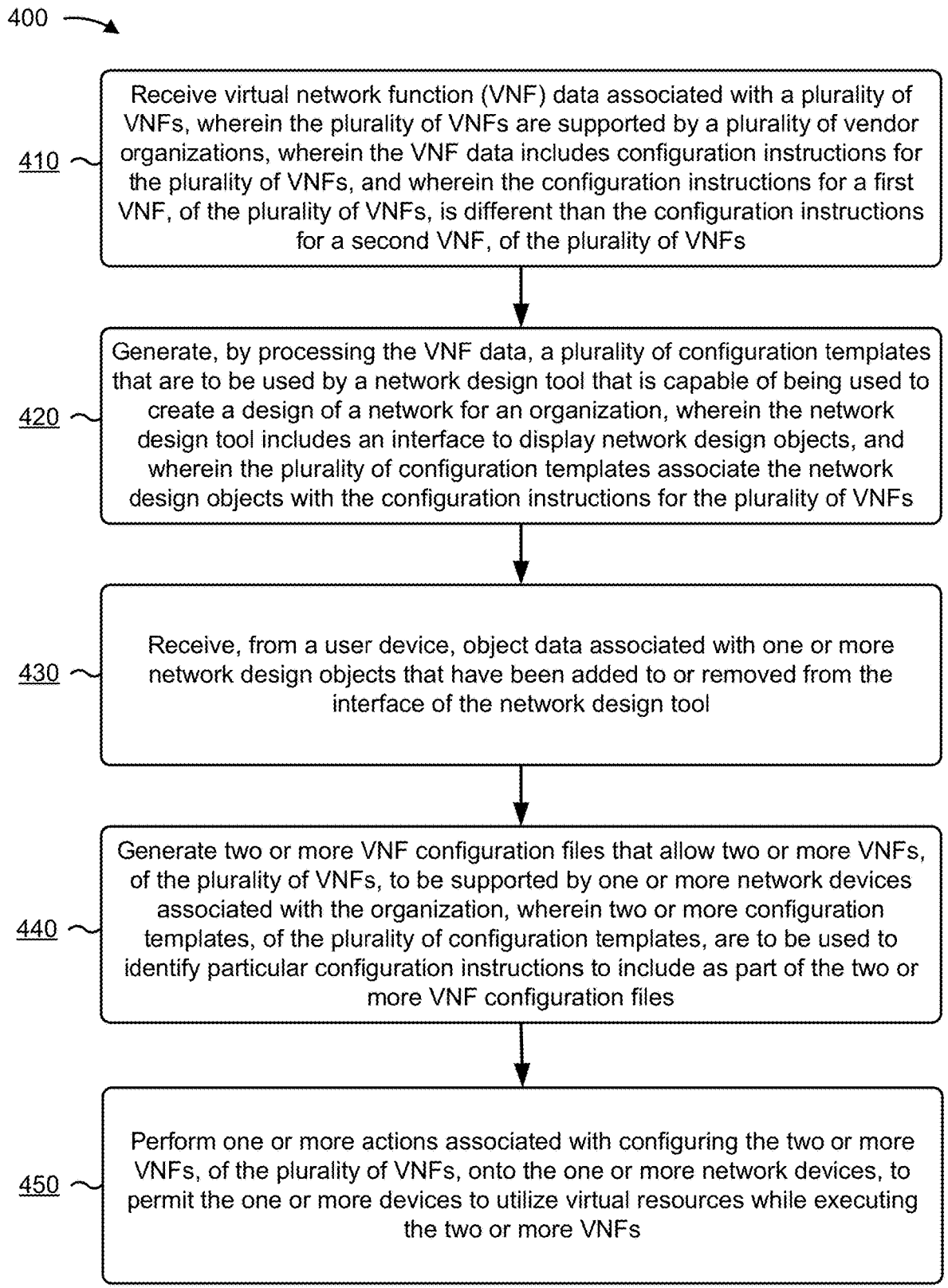
FIG. 4 is a flow chart of an example process for automatically generating a group of virtual network function (VNF) configuration files for a group of VNFs and performing one or more actions associated with using the VNF configuration files to configure and/or to deploy the group of VNFs.

FIG. 4 is a flow chart of an example process 400 for automatically generating a group of virtual network function (VNF) configuration files for a group of VNFs and performing one or more actions associated with using the VNF configuration files to configure and/or to deploy the group of VNFs. In some implementations, one or more process blocks of FIG. 4 can be performed by a network design platform (e.g., network design platform 230). In some implementations, one or more process blocks of FIG. 4 can be performed by another device or a group of devices separate from or including the network design platform, such as a user device (e.g., user device 210), a vendor device (e.g., vendor device 220), and/or a cloud server device (e.g., cloud server device 250).

As shown in FIG. 4, process 400 can include receiving virtual network function (VNF) data associated with a plurality of VNFs, wherein the plurality of VNFs are supported by a plurality of vendor organizations, wherein the VNF data includes configuration instructions for the plurality of VNFs, and wherein the configuration instructions for a first VNF, of the plurality of VNFs, is different than the configuration instructions for a second VNF, of the plurality of VNFs (block 410). For example, the network design platform (e.g., using processor 320, input component 350, communication interface 370, etc.) can receive virtual network function (VNF) data associated with a plurality of VNFs, wherein the plurality of VNFs are supported by a plurality of vendor organizations, as described above with regard to FIGS. 1A-1C.

In some implementations, the plurality of VNFs can be supported by a plurality of vendor organizations. In some implementations, the VNF data can include configuration instructions for the plurality of VNFs. In some implementations, the configuration instructions for a first VNF, of the plurality of VNFs, can be different than the configuration instructions for a second VNF, of the plurality of VNFs.

As further shown in FIG. 4, process 400 can include generating, by processing the VNF data, a plurality of configuration templates that are to be used by a network design tool that is capable of being used to create a design of a network for an organization, wherein the network design tool includes an interface to display network design objects, and wherein the plurality of configuration templates associate the network design objects with the configuration instructions for the plurality of VNFs (block 420). For example, the network design platform (e.g., using computing resource 235, processor 320 etc.) can generate, by processing the VNF data, a plurality of configuration templates that are to be used by a network design tool that is capable of being used to create a design of a network for an organization, as described above with regard to FIGS. 1A-1C.

In some implementations, the network design tool can include an interface to display network design objects. In some implementations, the plurality of configuration templates can associate the network design objects with the configuration instructions for the plurality of VNFs.

As further shown in FIG. 4, process 400 can include receiving, from a user device, object data associated with one or more network design objects that have been added to or removed from the interface of the network design tool (block 430). For example, the network design platform (e.g., using processor 320, input component 350, communication interface 370, etc.) can receive, from the user device, object data associated with one or more network design objects that have been added to or removed from the interface of the network design tool, as described above with regard to FIGS. 1A-1C.

As further shown in FIG. 4, process 400 can include generating two or more VNF configuration files that allow two or more VNFs, of the plurality of VNFs, to be supported by one or more network devices associated with the organization, wherein two or more configuration templates, of the plurality of configuration templates, are to be used to identify particular configuration instructions to include as part of the two or more VNF configuration files (block 440). For example, the network design platform (e.g., using computing resource 235, processor 320 etc.) can generate two or more VNF configuration files that allow two or more VNFs, of the plurality of VNFs, to be supported by one or more network devices associated with the organization, as described above with regard to FIGS. 1A-1C. In some implementations, two or more configuration templates, of the plurality of configuration templates, can be used to identify particular configuration instructions to include as part of the two or more VNF configuration files.

As further shown in FIG. 4, process 400 can include performing one or more actions associated with configuring the two or more VNFs, of the plurality of VNFs, onto the one or more network devices, to permit the one or more devices to utilize virtual resources while executing the two or more VNFs (block 450). For example, the network design platform (e.g., using computing resource 235, processor 320, input component 350, output component 360, communication interface 370, etc.) can perform one or more actions associated with configuring the two or more VNFs, of the plurality of VNFs, onto the one or more network devices, to permit the one or more devices to utilize virtual resources while executing the two or more VNFs, as described above with regard to FIGS. 1A-1C.

Process 400 can include additional implementations, such as any single implementation or any combination of implementations described below and/or in connection with one or more other processes described elsewhere herein.

In some implementations, particular configuration instructions for the two or more VNFs utilize at least one of a plurality of types of programming syntax, a plurality of program code structures, or a plurality of program code naming conventions. In some implementations, the first VNF can be supported by virtual resources associated with a first cloud service provider and the second VNF can be supported by virtual resources associated with a second cloud service provider. In some implementations, the two or more VNFs can be provided by two or more vendor organizations of the plurality of vendor organizations.

In some implementations, the two or more VNFs can include a first VNF configuration file associated with the first VNF and a second VNF configuration file associated with the second VNF. Additionally, while performing the one or more actions, the network design platform can configure the first VNF and the second VNF onto a first network device of the one or more network devices. Additionally, the first VNF configuration file and the second VNF configuration file can include instructions that permit the first VNF and the second VNF to interact with each other after being deployed on the first network device.

In some implementations, the network design platform can, while performing the one or more actions, simulate configuration of the two or more VNFs using one or more test environments. Additionally, the network design platform can provide the two or more VNFs to the one or more network devices based on an outcome of simulating the configuration of the two or more VNFs.

In some implementations, the network design platform can, while performing the one or more actions, receive network configuration data for the one or more network devices. Additionally, the network design platform can perform a dynamic value replacement to replace dynamic values included in the two or more VNF configuration files with values included in the network configuration data. Additionally, the network design platform can provide the two or more VNFs to the one or more network devices after replacing the dynamic values with the values included in the network configuration data.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5B:
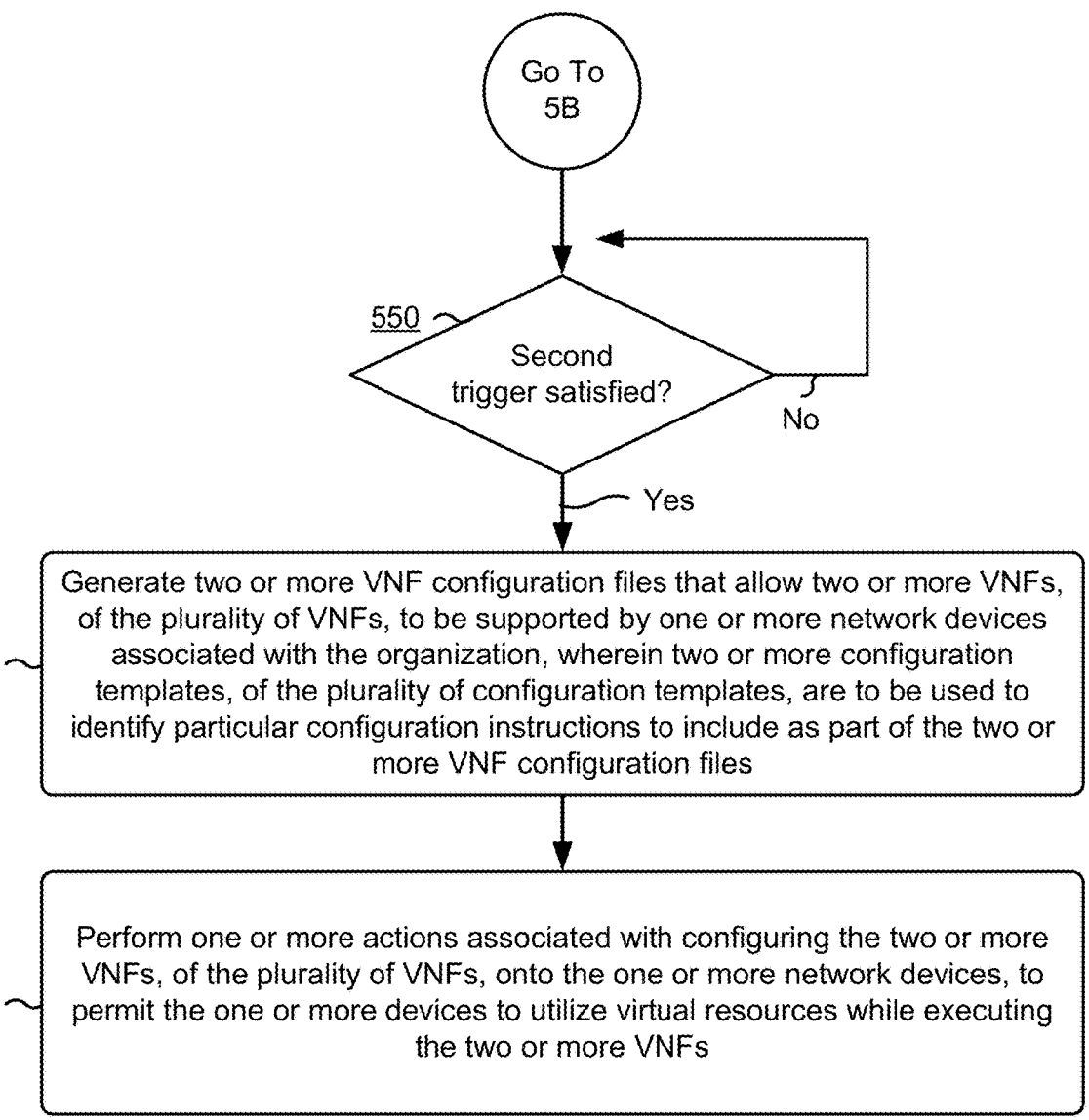

FIGS. 5A and 5B are a flow chart of an example process 500 for automatically generating a group of virtual network function (VNF) configuration files for a group of VNFs and performing one or more actions associated with using the VNF configuration files to configure and/or to deploy the group of VNFs. In some implementations, one or more process blocks of FIG. 5 can be performed by a network design platform (e.g., network design platform 230). In some implementations, one or more process blocks of FIG. 5 can be performed by another device or a group of devices separate from or including the network design platform, such as a user device (e.g., user device 210), a vendor device (e.g., vendor device 220), and/or a cloud server device (e.g., cloud server device 250).

As shown in FIG. 5A, process 500 can include receiving virtual network function (VNF) data associated with a plurality of VNFs, wherein the plurality of VNFs are supported by a plurality of vendor organizations, wherein the VNF data includes configuration instructions for the plurality of VNFs, and wherein the configuration instructions for a first VNF, of the plurality of VNFs, is different than the configuration instructions for a second VNF, of the plurality of VNFs (block 510). Additional information regarding block 510 may be found in FIGS. 1A-1C and FIG. 4.

As shown in FIG. 5A, process 500 can include determining whether a first trigger is satisfied (block 520). For example, the network design platform (e.g., using computing resource 235, processor 320, etc.) may determine whether a first trigger is satisfied by monitoring whether VNF data has been received, whether a threshold amount of VNF data has been received, whether a current time period satisfies a threshold time period, and/or the like.

If the network design platform determines that the first trigger is not satisfied, the network design platform may continue monitoring for the trigger. If the network design platform determines that the first trigger is satisfied, then the network design platform may perform one or more actions described in block 530.

As further shown in FIG. 5A, process 500 can include generating, by processing the VNF data, a plurality of configuration templates that are to be used by a network design tool that is capable of being used to create a design of a network for an organization, wherein the network design tool includes an interface to display network design objects, and wherein the plurality of configuration templates associate the network design objects with the configuration instructions for the plurality of VNFs (block 530). Additional information regarding block 530 may be found in FIGS. 1A-1C and FIG. 4.

As further shown in FIG. 5A, process 500 can include receiving, from a user device, object data associated with one or more network design objects that have been added to or removed from the interface of the network design tool (block 540). Additional information regarding block 540 may be found in FIGS. 1A-1C and FIG. 4.

As further shown in FIG. 5B, process 500 can include determining whether a second trigger is satisfied (block 550). For example, the network design platform (e.g., using computing resource 235, processor 320, etc.) may determine whether a second trigger is satisfied by monitoring whether a request to create a network design has been received, whether the user device has requested to launch the network design tool, whether a current time period satisfies a threshold time period, and/or the like.

If the network design platform determines that the second trigger is not satisfied, the network design platform may continue monitoring for the second trigger. If the network design platform determines that the second trigger is satisfied, then the network design platform may perform one or more actions described in block 560.

As further shown in FIG. 5B, process 500 can include generating two or more VNF configuration files that allow two or more VNFs, of the plurality of VNFs, to be supported by one or more network devices associated with the organization, wherein two or more configuration templates, of the plurality of configuration templates, are to be used to identify particular configuration instructions to include as part of the two or more VNF configuration files (block 560). Additional information regarding block 560 may be found in FIGS. 1A-1C and FIG. 4.

As further shown in FIG. 5B, process 500 can include performing one or more actions associated with configuring the two or more VNFs, of the plurality of VNFs, onto the one or more network devices, to permit the one or more devices to utilize virtual resources while executing the two or more VNFs (block 570). Additional information regarding block 570 may be found in FIGS. 1A-1C and FIG. 4.

Although FIGS. 5A and 5B show example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

In this way, the network design platform is able to orchestrate automatic configuration and/or deployment of VNFs that have different configuration properties. Additionally, the network design platform conserves processing resources and/or network resources that might otherwise be used to improperly configure, test, and/or synergize the set of VNFs, perform error correction procedures associated with the improper configuration, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Certain user interfaces have been described herein and/or shown in the figures. A user interface can include a graphical user interface, a non-graphical user interface, a text-based user interface, or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, virtual network function (VNF) data associated with a plurality of VNFs,
      wherein the VNF data includes first configuration instructions for a first VNF of the plurality of VNFs and second configuration instructions for a second VNF of the plurality of VNFs;
   determining, by the device, whether a trigger is satisfied by monitoring whether a threshold amount of the VNF data has been received;
   generating, by the device, based on determining that the trigger is satisfied, and based on processing the VNF data, a plurality of configuration templates that are to be used by a network design tool that is capable of being used to create a design of a network for an organization,
      wherein the plurality of configuration templates associate network design objects, associated with the network design tool, with the configuration instructions for the plurality of VNFs;
   generating, by the device, two or more VNF configuration files that allow two or more VNFs, that include the first VNF and the second VNF, to be supported by one or more network devices,
      wherein generating the two or more VNF configuration files comprises,
         providing a first set of interfaces, associated with a set of security-related VNFs, on a user interface that is used to access the network design tool,
         providing a second set of interfaces, associated with a set of routing-related VNFs, on the user interface, and
         receiving object data associated with adding or removing one or more of the network design objects corresponding to at least one of the first set of interfaces or the second set of interfaces, and
      wherein two or more configuration templates, of the plurality of configuration templates, and the object data are to be used to identify particular configuration instructions to include as part of the two or more VNF configuration files; and
   performing, by the device, one or more actions associated with configuring the two or more VNFs onto the one or more network devices, to permit the one or more network devices to utilize virtual resources while executing the two or more VNFs,
      wherein performing the one or more actions comprises:
         receiving network configuration data for the one or more network devices,
         performing a dynamic value replacement to replace dynamic values included in the two or more VNF configuration files with values included in the network configuration data, and
         providing the two or more VNFs to the one or more network devices after replacing the dynamic values with the values included in the network configuration data.

2. The method of claim 1, wherein the particular configuration instructions for the two or more VNFs utilize at least one of:
   a plurality of types of programming syntax,
   a plurality of program code structures, or
   a plurality of program code naming conventions.

3. The method of claim 1, wherein the first VNF is supported by virtual resources associated with a first cloud service provider and the second VNF is supported by virtual resources associated with a second cloud service provider.

4. The method of claim 1, wherein the two or more VNFs are provided by a plurality of vendor organizations.

5. The method of claim 1, wherein the two or more VNFs include a first VNF configuration file associated with the first VNF and a second VNF configuration file associated with the second VNF; and
wherein performing the one or more actions comprises:
configuring the first VNF and the second VNF onto a first network device of the one or more network devices,
wherein the first VNF configuration file and the second VNF configuration file include instructions that permit the first VNF and the second VNF to interact with each other after being deployed on the first network device.

6. The method of claim 1, wherein performing the one or more actions comprises:
simulating configuration of the two or more VNFs using one or more test environments, and
providing the two or more VNFs to the one or more network devices based on an outcome of simulating the configuration of the two or more VNFs.

7. The method of claim 1, wherein the values included in the network configuration data include one or more of:
one or more internet protocol (IP) addresses assigned to the one or more network devices when the one or more network devices join the network,
one or more interface identifiers for the one or more network devices, or
performance data of the one or more network devices.

8. The method of claim 1, wherein the trigger is a first trigger, and
wherein generating the two or more VNF configuration files is further based on determining whether a second trigger is satisfied,
wherein the second trigger is satisfied based on a current time period satisfying a threshold time period.

9. The method of claim 1, wherein the VNF data is associated with a plurality of vendor organizations related to the one or more network devices associated with the organization.

10. A device, comprising:
one or more memories; and
one or more processors, operatively connected to the one or more memories, to:
receive virtual network function (VNF) data associated with a plurality of VNFs,
wherein the VNF data includes first configuration instructions for a first VNF of the plurality of VNFs and second configuration instructions for a second VNF of the plurality of VNFs;
determine whether a trigger is satisfied by monitoring whether a threshold amount of the VNF data has been received;
generate, based on determining that the trigger is satisfied and by processing the VNF data, a plurality of configuration templates that are to be used by a network design tool that is capable of being used to create a design of a network for an organization,
wherein the plurality of configuration templates associate network design objects, associated with the network design tool, with the configuration instructions for the plurality of VNFs;
generate two or more VNF configuration files that allow two or more VNFs, that include the first VNF and the second VNF, to be supported by one or more network devices,
wherein generating the two or more VNF configuration files comprises,
providing a first set of interfaces, associated with a set of security-related VNFs, on a user interface that is used to access the network design tool,
providing a second set of interfaces, associated with a set of routing-related VNFs, on the user interface, and
receiving object data associated with adding or removing one or more of the network design objects corresponding to at least one of the first set of interfaces or the second set of interfaces, and
wherein two or more configuration templates, of the plurality of configuration templates, and the object data are to be used to identify particular configuration instructions to include as part of the two or more VNF configuration files; and
perform one or more actions associated with configuring the two or more VNFs onto the one or more network devices, to permit the one or more network devices to utilize virtual resources while executing the two or more VNFs,
wherein the one or more processors, when performing the one or more actions, are to:
receive network configuration data for the one or more network devices,
perform a dynamic value replacement to replace dynamic values included in the two or more VNF configuration files with values included in the network configuration data, and
provide the two or more VNFs to the one or more network devices after replacing the dynamic values with the values included in the network configuration data.

11. The device of claim 10, wherein the configuration instructions for the plurality of VNFs utilize at least one of:
a plurality of types of programming syntax,
a plurality of program code structures, or
a plurality of program code naming conventions.

12. The device of claim 10, wherein the first VNF is supported by virtual resources associated with a first cloud service provider and the second VNF is supported by virtual resources associated with a second cloud service provider.

13. The device of claim 10, wherein the two or more VNFs are provided by a plurality of vendor organizations.

14. The device of claim 10, wherein the two or more VNFs include a first VNF configuration file associated with the first VNF and a second VNF configuration file associated with the second VNF; and
wherein performing the one or more actions comprises:
configuring the first VNF and the second VNF to a first network device of the one or more network devices,
wherein the first VNF configuration file and the second VNF configuration file include instructions that permit the first VNF and the second VNF to interact with each other after being deployed on the first network device.

15. The device of claim 10, wherein the one or more processors, when performing the one or more actions, are to:

simulate configuration of the two or more VNFs using one or more test environments, and provide the two or more VNFs to the one or more network devices based on an outcome of simulating the configuration of the two or more VNFs.

16. A non-transitory computer-readable medium storing instructions, the instructions comprising:

one or more instructions that, when executed by one or more processors, cause the one or more processors to:
receive virtual network function (VNF) data associated with a plurality of VNFs,
wherein the VNF data includes first configuration instructions for a first VNF of the plurality of VNFs and second configuration instructions for a second VNF of the plurality of VNFs;
determine whether a trigger is satisfied by monitoring whether a threshold amount of the VNF data has been received;
generate, based on determining that the trigger is satisfied and by processing the VNF data, a plurality of configuration templates that are to be used by a network design tool that is capable of being used to create a design of a network for an organization,
wherein the plurality of configuration templates associate network design objects, associated with the network design tool, with the configuration instructions for the plurality of VNFs;
generate two or more VNF configuration files that allow two or more VNFs, that include the first VNF and the second VNF, to be supported by one or more network devices,
wherein generating the two or more VNF configuration files comprises,
providing a first set of interfaces, associated with a set of security-related VNFs, on a user interface that is used to access the network design tool,
providing a second set of interfaces, associated with a set of routing-related VNFs, on the user interface, and
receiving object data associated with adding or removing one or more of the network design objects corresponding to at least one of the first set of interfaces or the second set of interfaces, and
wherein two or more configuration templates, of the plurality of configuration templates, and the object data are to be used to identify particular configuration instructions to include as part of the two or more VNF configuration files; and perform one or more actions associated with configuring the two or more VNFs onto the one or more network devices, to permit the one or more network devices to utilize virtual resources while executing the two or more VNFs,
wherein the one or more instructions, that cause the one or more processors to perform the one or more actions, cause the one or more processors to:
receive network configuration data for the one or more network devices,
perform a dynamic value replacement to replace dynamic values included in the two or more VNF configuration files with values included in the network configuration data, and
provide the two or more VNFs to the one or more network devices after replacing the dynamic values with the values included in the network configuration data.

17. The non-transitory computer-readable medium of claim 16, wherein the configuration instructions for the plurality of VNFs utilize at least one of:
a plurality of types of programming syntax,
a plurality of program code structures, or
a plurality of program code naming conventions.

18. The non-transitory computer-readable medium of claim 16, wherein the first VNF is supported by virtual resources associated with a first cloud service provider and the second VNF is supported by virtual resources associated with a second cloud service provider.

19. The non-transitory computer-readable medium of claim 16, wherein the two or more VNFs include a first VNF configuration file associated with the first VNF and a second VNF configuration file associated with the second VNF; and
wherein performing the one or more actions comprises:
configuring the first VNF and the second VNF on a first network device of the one or more network devices,
wherein the first VNF configuration file and the second VNF configuration file include instructions that permit the first VNF and the second VNF to interact with each other after being deployed on the first network device.

20. The non-transitory computer-readable medium of claim 16, wherein the one or more instructions, that cause the one or more processors to perform the one or more actions, cause the one or more processors to:
simulate configuration of the two or more VNFs using one or more test environments, and
provide the two or more VNFs to the one or more network devices based on an outcome of simulating the configuration of the two or more VNFs.

\* \* \* \* \*